United States Patent
Ando

(10) Patent No.: US 10,123,399 B2
(45) Date of Patent: Nov. 6, 2018

(54) LUMINAIRE, LIGHTING SYSTEM, AND SETTING METHOD IN LIGHTING SYSTEM

(71) Applicant: Panasonic Intellectual Property Management Co., Ltd., Osaka (JP)

(72) Inventor: Tamotsu Ando, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/495,575

(22) Filed: Apr. 24, 2017

(65) Prior Publication Data

US 2017/0318650 A1    Nov. 2, 2017

(30) Foreign Application Priority Data

Apr. 27, 2016    (JP) .................. 2016-089377

(51) Int. Cl.
| | |
|---|---|
| H05B 37/02 | (2006.01) |
| F21S 9/04 | (2006.01) |
| H02N 2/00 | (2006.01) |
| H05B 33/08 | (2006.01) |
| F21Y 115/10 | (2016.01) |

(52) U.S. Cl.
CPC .......... *H05B 37/0272* (2013.01); *F21S 9/04* (2013.01); *H02N 2/0075* (2013.01); *H05B 33/0845* (2013.01); *H05B 33/0857* (2013.01); *F21Y 2115/10* (2016.08); *H05B 33/0803* (2013.01)

(58) Field of Classification Search
CPC .......... H05B 37/0272; H05B 33/0845; H05B 33/0857; F21S 9/04; F21Y 2115/10
USPC .......................................... 315/55
See application file for complete search history.

(56) References Cited

U.S. PATENT DOCUMENTS

| 9,609,720 B2 * | 3/2017 | Woytowitz | |
|---|---|---|---|
| 2002/0175641 A1 * | 11/2002 | Andersen | H05B 41/2822 315/307 |
| 2007/0229250 A1 * | 10/2007 | Recker | G08B 5/36 340/531 |
| 2012/0068600 A1 * | 3/2012 | Hartmann | F21V 3/00 315/51 |
| 2013/0270998 A1 * | 10/2013 | Pi | H05B 33/0863 315/51 |
| 2014/0361693 A1 * | 12/2014 | Angelin | H05B 33/0842 315/152 |

(Continued)

FOREIGN PATENT DOCUMENTS

| JP | 05-089972 A | 4/1993 |
|---|---|---|
| JP | 2001-250698 A | 9/2001 |

(Continued)

*Primary Examiner* — Don Le
(74) *Attorney, Agent, or Firm* — McDermott Will & Emery LLP

(57) ABSTRACT

A luminaire includes a body case and a lighting device mounted on the body case. The lighting device includes: a power generator which generates electric power upon being pressed when the lighting device having a light source is mounted onto the body case; a wireless module which performs wireless communication; and a controller connected to the power generator. When the lighting device is mounted onto the body case, the controller transmits identification information by which the lighting device is identified, via the wireless module using the electric power generated by the power generator.

16 Claims, 9 Drawing Sheets

(56) References Cited

U.S. PATENT DOCUMENTS

| | | | |
|---|---|---|---|
| 2015/0062883 A1* | 3/2015 | Shen | F21L 4/027 |
| | | | 362/183 |
| 2015/0305122 A1* | 10/2015 | Saes | H05B 33/0842 |
| | | | 315/129 |
| 2015/0330587 A1* | 11/2015 | Lax | F21S 9/022 |
| | | | 362/191 |
| 2016/0063853 A1* | 3/2016 | Mi | G08C 17/02 |
| | | | 340/12.5 |
| 2016/0073474 A1* | 3/2016 | Van De Sluis | H05B 37/0272 |
| | | | 315/312 |
| 2016/0353560 A1* | 12/2016 | Bortolotti | H04W 4/70 |
| 2016/0374179 A1* | 12/2016 | Newton | H05B 33/0845 |
| 2017/0074471 A1* | 3/2017 | Panek | F21S 2/005 |
| 2017/0264452 A1* | 9/2017 | Vollmer | H04L 12/2836 |

FOREIGN PATENT DOCUMENTS

| | | |
|---|---|---|
| JP | 2002-324686 A | 11/2002 |
| JP | 2004-055450 A | 2/2004 |
| JP | 2006-085344 A | 3/2006 |
| JP | 2007-157361 A | 6/2007 |
| JP | 2007-281944 A | 10/2007 |
| JP | 2010-044950 A | 2/2010 |

* cited by examiner

LUMINAIRE, LIGHTING SYSTEM, AND SETTING METHOD IN LIGHTING SYSTEM

CROSS REFERENCE TO RELATED APPLICATION

This application claims the benefit of priority of Japanese Patent Application Number 2016-089377 filed on Apr. 27, 2016, the entire content of which is hereby incorporated by reference.

BACKGROUND

1. Technical Field

The present disclosure relates to luminaires, lighting systems, and setting methods in the lighting systems, and particularly to luminaires installed in a large facility that is for example an office, a warehouse, or the like, and a lighting system including the luminaires, and a setting method in the lighting system.

2. Description of the Related Art

A conventional luminaire includes: a rapid-start fluorescent lamp which is an example of a lighting device, a wireless transmitter which is an example of a wireless communicator that is installed in the rapid-start fluorescent lamp, and a controller which transmits an operation state of the fluorescent lamp via the wireless transmitter (for example, see Patent Literature (PTL) 1 (Japanese Unexamined Patent Application Publication No. 2010-44950)).

SUMMARY

However, the luminaire disclosed in PTL 1 requires much effort for performing a pairing operation between a terminal and the luminaire. Thus, there is a demand for easily performing such a pairing operation.

The present disclosure was made to solve such a problem, and has an object to provide a luminaire, a lighting system, and a setting method in the lighting system which enables a pairing operation even when no electric power is being supplied from any grid power.

In order to solve the above problem, the luminaire according to an aspect of the present disclosure includes a body case and a lighting device mounted on the body case. The lighting device includes: a power generator which generates electric power upon being pressed when a lighting device including a light-emitting element is mounted onto the body case; a wireless communicator which performs wireless communication; and a controller which transmits identification information by which the lighting device is identified, via the wireless communicator, using the electric power generated by the power generator when the lighting device is mounted onto the body case.

In addition, in the lighting system according to the aspect of the present disclosure, an installation area for installing the luminaire accommodates a plurality of the luminaires.

In addition, a setting method in the lighting system according to an aspect of the present disclosure includes: obtaining, by the terminal, information indicating installation states of the plurality of luminaires in the installation area; selecting one luminaire from among the plurality of luminaires displayed on the display after the obtaining, and placing the identification information in a reception waiting state; mounting, onto the body case, the lighting device in the one luminaire selected in the selecting; receiving, by the terminal, the identification information transmitted by the controller via the wireless communicator, immediately after the mounting; and pairing the terminal with the one luminaire.

According to the present disclosure, it is possible to perform a pairing operation even when no electric power is being supplied from any grid power.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Figure 1:
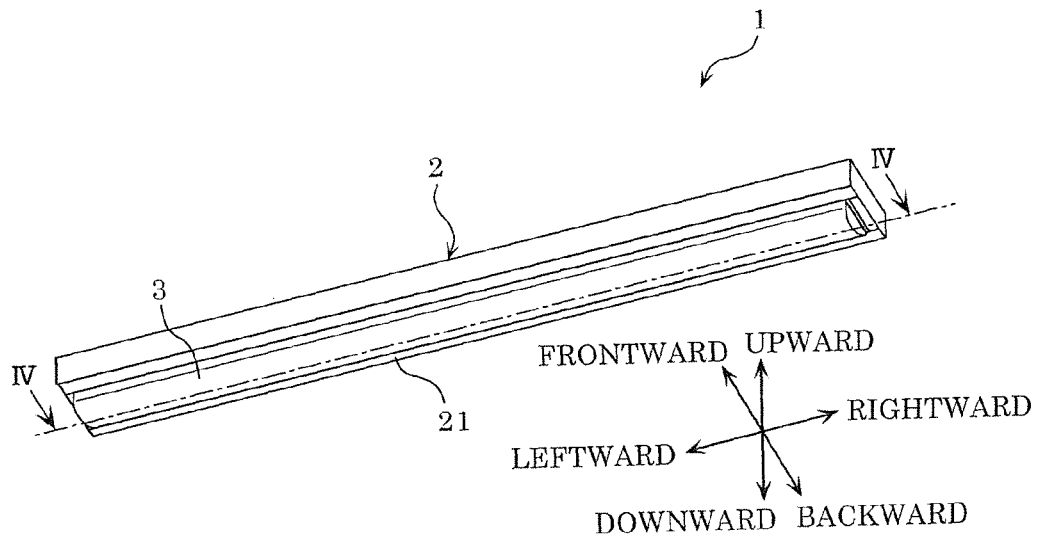
FIG. 1 is a perspective view of a luminaire according to an embodiment.

Underlying Knowledge Forming Basis of the Present Disclosure

In a comparatively large facility that is for example an office or a warehouse, normally, a plurality of luminaires are installed on its ceiling(s). In recent years, these luminaires are each configured to include a wireless communicator capable of performing wireless communication, and to be capable of performing turn-on, turn-off, dimming operations etc. for the luminaire via the wireless communicator.

In the case of the luminaire configured like this, it is only necessary that a switch box (a remote controller for operating the luminaire independently of the luminaire) be attached to a column, a wall, or the like. Thus, a line for electrically connecting the switch box and the luminaire is excluded. For this reason, it is possible to simplify a wiring operation for installing such wiring significantly. The switch box is, for example, a remote controller attached on a wall.

In addition, there is no need for a working person in the comparatively large facility that is for example the office or the warehouse to go to a distant place at which the switch box is located in order to perform turn-on, turn-off, dimming operations etc. using the remote controller at hand. For this reason, such a luminaire which can be controlled by a remote controller is extremely convenient.

However, the luminaire installed in the comparatively large facility that is for example the office or the warehouse need to be subjected to an operation (a pairing operation) for associating between the luminaire and the terminal (a smartphone, a tablet terminal, a remote controller, a switch box, or the like.), after the lighting device of the luminaire is mounted onto the body case attached on the ceiling. When a plurality of lighting devices are installed in a plurality of body cases in a one-to-one correspondence in the comparatively large facility that is for example the office or the warehouse, there is a need to perform an operation for associating one of the luminaires and the terminal after the corresponding one of the lighting devices is mounted onto the corresponding body case, and to repeat such an operation several times. For this reason, the number of operations for associating the respective luminaires and the terminal increases as the number of the target portions of the operations increases. It is troublesome for the installer to perform such operations that require much effort.

The unique identification information of each of the lighting devices installed on the ceiling(s) is obtainable in advance as a matter of course. However, for example, when a plurality of lighting devices are installed in a large room, operations for searching the room for luminaires which can be associated with the terminal are hard operations. Even when the installer can identify the locations at which the luminaires are installed based on a luminaire installation diagram etc. used to mount the luminaires onto which the lighting devices displayed via a display of the terminal are respectively mounted, the operations for associating the terminal and the luminaires require much effort.

More specifically, first, a state in which electric power is being supplied from a grid power to the luminaire is created, and then the installer checks the luminaire installation diagram displayed on the display of the terminal, and selects one of the luminaires. The terminal transmits the identification information of the selected luminaire to the luminaire. The selected luminaire receives the identification information from the terminal, and transitions to a blinking state in which a turn-on and a turn-off are repeated. The installer determines where the luminaire in the blinking state is present, to confirm the location of the luminaire.

Next, the installer goes to the place where the luminaire in the blinking state is present. The installer performs an operation for associating the luminaire in the blinking state and one of the luminaires which has already been selected in the luminaire installation diagram, by operating the terminal again.

Through the operation like this, a series of operations for associating the terminal and one of the luminaires are finished. When a plurality of luminaires to be installed are present, the installer needs to go to different places and perform similar operations for the respective luminaires. For this reason, in the comparatively large facility that is for example the office or the warehouse, the series of operations for associating the terminal and the luminaires require too much time. For this reason, the load on the installer is heavy.

In addition, normally, electric power is supplied from the grid power to the luminaire etc. after the facility is completed, and thus such an operation is performed after the electric power is supplied from the grid power. In other words, it is impossible to perform such an operation before the electric power is supplied from the grid power. For this reason, the installer goes to the facility again, and performs such operations when the electric power is supplied from the grid power.

For this reason, the series of operations for associating the terminal and the luminaires require much time and effort, and installation efficiency is low. Thus, there is a demand for simplifying such operations.

In view of this, the luminaire, the lighting system, and the setting method for the lighting system according to the present disclosure make it possible to perform pairing operations even when no electric power is being supplied from any grid power. In addition, in the setting method in the lighting system like this, it is possible to increase operability of the installation operations for the luminaires (reduce complexity in the pairing operations).

Hereinafter, an embodiment and variations of the embodiment of the present disclosure is described with reference to the drawings. Each of the embodiment and the variations described below indicates a general or specific example of the present disclosure. Accordingly, the numerical values, shapes, materials, constituent elements, the arrangement and connection of the constituent elements, etc. shown in the following exemplary embodiment and variations are mere examples, and therefore do not limit the scope of the appended Claims and their equivalents. Therefore, among the constituent elements in the following exemplary embodiments and variations, constituent elements not recited in any one of the independent claims are described as arbitrary constituent elements.

It is to be noted that, taking "approximately the same" as an example, the phrase of "approximately . . . " used herein is intended to cover, not only "completely the same" but also "substantially the same".

Each diagram is a schematic diagram, and thus is not always precisely illustrated. In each diagram, substantially the same elements are assigned with the same reference numerals, and overlapping descriptions are omitted or simplified.

(Embodiment)

Hereinafter, luminaire 1 and a setting method in lighting system 100 according to the present disclosure are described.

[Configuration]

First, the configuration of luminaire 1 according to an embodiment of the present disclosure is described with reference to FIGS. 1 to 4.

Figure 2:
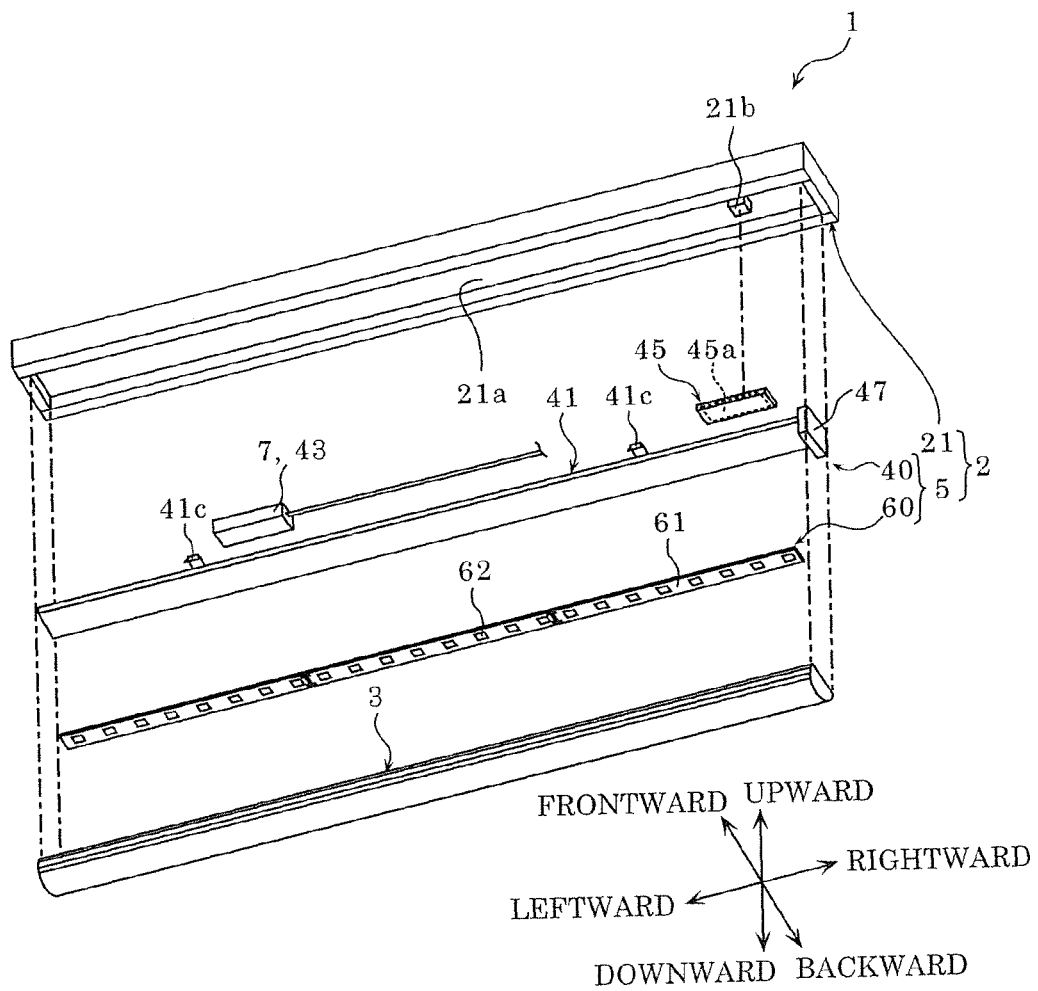
FIG. 2 is an exploded perspective view of the luminaire according to the embodiment.
Figure 3:
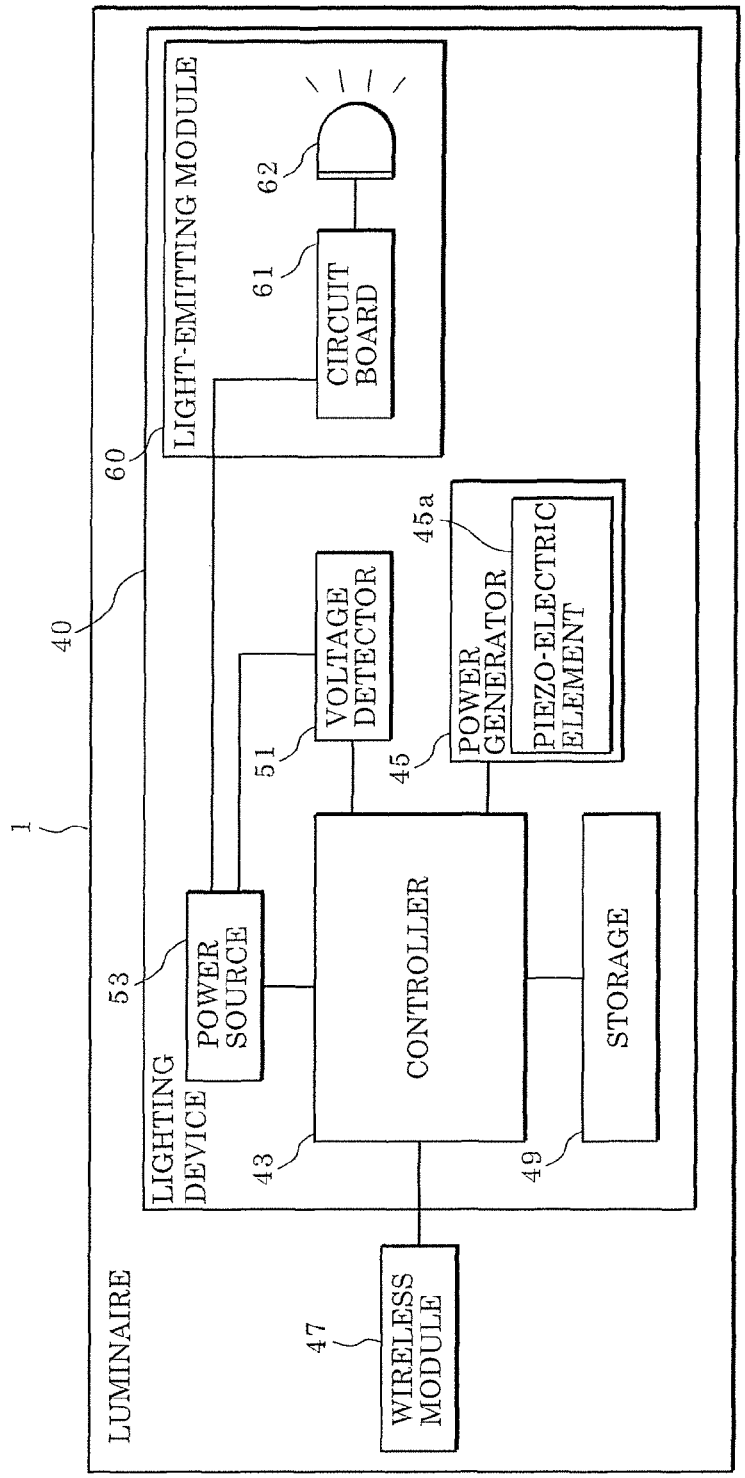
FIG. 3 is a block diagram of the luminaire according to the embodiment.
Figure 4:
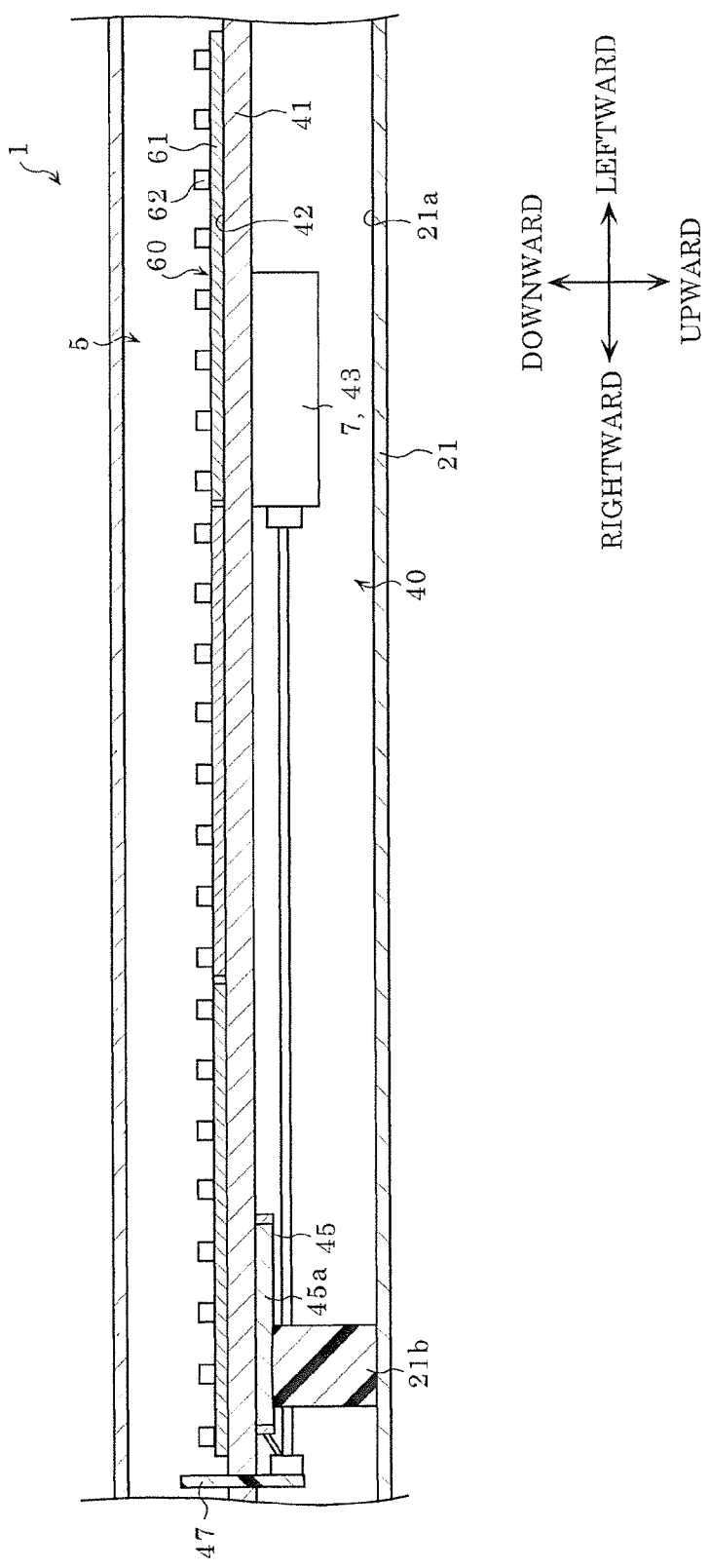
FIG. 4 is a cross-sectional view of the luminaire when cut along line IV-IV according to the embodiment.

FIG. 1 is a perspective view of luminaire 1 according to an embodiment. FIG. 2 is an exploded perspective view of luminaire 1 according to this embodiment. FIG. 3 is a block diagram of luminaire 1 according to this embodiment. FIG. 4 is a cross-sectional view of luminaire 1 when cut along line IV-IV in FIG. 1.

In FIG. 1, in a state where luminaire 1 is installed on a ceiling; the direction toward the cover is defined as the DOWNWARD direction; the direction toward the opposite side (toward the ceiling) of the direction toward the cover is defined as the UPWARD direction; the direction toward the wireless module is defined as the LEFTWARD direction; the direction toward the opposite side of the direction toward the wireless communicator is defined as the RIGHTWARD direction; the direction toward the engagement part is defined as the FRONTWARD direction; and the direction toward the opposite side of the direction toward the connector is defined as the BACKWARD direction. Individual directions shown in the drawings after FIG. 1 all correspond to those in FIG. 1. It is to be noted that, in FIG. 1, the UPWARD and DOWNWARD directions, the LEFTWARD and RIGHTWARD directions, and the FRONTWARD and BACKWARD directions vary depending on a mode of use, and thus directions are not limited thereto. This holds true for the drawings after FIG. 1.

As illustrated in FIG. 1, luminaire 1 is an LED lamp having a long shape, and is used, for example, in a state where luminaire 1 is fixed on a ceiling using fixtures such as screws.

Luminaire 1 includes luminaire body 2 and cover 3. Luminaire body 2 is a main member of luminaire 1. Luminaire body 2 includes body case 21 and lighting device 5.

Body case 21 has a long shape, and has a shape of a quadrate which is approximately symmetrical in the LEFTWARD-RIGHTWARD direction in cross-sectional views of Body case 21 along planes defined in the UPWARD-DOWNWARD direction and the LEFTWARD-RIGHTWARD direction. As illustrated in FIG. 2, in body case 21, housing 21a is formed in body case 21 so that housing 21a is recessed from the lower surface of body case 21 upwardly. Housing 21a is a groove which extends in the LEFTWARD-RIGHTWARD direction. Housing 21a houses lighting device 5 including controller 43, power generator 45, base 41, light-emitting module 60, etc. Controller 43 and power generator 45, base 41, light-emitting module 60, and cover 3 are arranged in order downwardly from the bottom surface of housing 21a.

On the bottom part of housing 21a, pressing protrusion 21b (an example of a protrusion) which can press piezo-electric element 45a of power generator 45 that is described later when lighting device 5 is installed in luminaire body 2. In this embodiment, pressing protrusion 21b protrudes from the bottom surface of housing 21a downwardly at the position corresponding to the position of piezo-electric element 45a of power generator 45 when lighting device 5 is installed in luminaire body 2. Pressing protrusion 21b may be a member different from the bottom part of housing 21a, or may be the same member integrally formed with the bottom part of housing 21a.

Lighting device 5 includes lighting device body 40 and light-emitting module 60.

As illustrated in FIGS. 2 and 3, lighting device body 40 includes base 41, controller 43, power generator 45, wireless module 47, storage 49, voltage detector 51, and power source 53.

Base 41 is a frame which is made of aluminum, iron, ceramic, resin in which metal filler is mixed, etc. and which is long in the LEFTWARD-RIGHTWARD direction. In this embodiment, base 41 is made of metal, and fixes circuit board 61 of light-emitting module 60 arranged on the lower surface of base 41.

As illustrated in FIG. 2, base 41 is attached detachably to body case 21. Base 41 includes two engagement parts which protrude in the FRONTWARD direction. Base 41 and body case 21 are fixed by means of two engagement parts 41c engaging one-to-one with two notches formed inside housing 21a of body case 21. It is to be noted that base 41 and body case 21 may be fixed by fixtures such as screws.

Controller 43 is housed in case 7 having a cuboid shape, and arranged between the rear surface (upper surface) of base 41 and the bottom part of housing 21a. Controller 43 controls operations performed by light-emitting module 60 according to user instructions (control signals via a smartphone, a tablet terminal, a remote controller, or the like). The operations include turn-on, turn-off, dimming (adjusting the brightness), color adjustment (adjustment of the color of light to be emitted (color temperature)) etc. For example, controller 43 controls values of current to be supplied to light-emitting module 60 according to an input control signal. Controller 43 is for example implemented as a micro-computer, a processor, or an exclusive circuit.

Controller 43 has a timer function for counting time from when an installer selected one of luminaire installation places 103a using display 102.

Power generator 45 has piezo-electric element 45a (a piezo element), and is electrically connected to controller 43. Power generator 45 is arranged at the right side in the proximity of wireless module 47, and is fixed on the rear surface (upper surface) of base 41 using fixtures such as screws or tapes, and is arranged between the rear surface (upper surface) of base 41 and the bottom part of housing 21a. As illustrated in FIG. 4, piezo-electric element 45a of power generator 45 is provided so as to be pressed by pressing protrusion 21b when lighting device 5 is mounted onto body case 21. In this embodiment, power generator 45 is a device having a plate shape, and piezo-electric element 45a is provided at the position corresponding to the position of pressing protrusion 21b when lighting device 5 is mounted onto body case 21. Piezo-electric element 45a is provided so that piezo-electric element 45a generates electric power instantaneously (at the same or approximately the same time of the mounting) when piezo-electric element 45a is pressed by pressing protrusion 21b. In short, electric power is generated instantaneously when piezo-electric element 45a is pressed by pressing protrusion 21b. The electric power of power generator 45 is supplied to controller 43, and, using the electric power, controller 43 transmits later-described identification information of lighting device 5 to terminal 101 via wireless module 47.

As illustrated in FIGS. 2 and 3, wireless module 47 transmits identification information to terminal 101, and receives and transmits a signal for controlling light-emitting module 60 according to at least one of a plurality of lighting functions. In other words, wireless module 47 receives the identification information and controls signals etc. via terminal 101, and transmits information indicating the result of controlling light-emitting module 60. It is to be noted that wireless module 47 may be, for example, a communication module for communicating a program distribution server via the Internet. In addition, communication devices such as a modem, a router, a relay server may be present between wireless module 47 and the program distribution server.

It is to be noted that communication devices such as a modem, a router, a relay server may be present between wireless module 47 and terminal 101. In other words, when wireless module 47 and terminal 101 communicate with each other, the communication includes transmission via a communication device. The communication also includes reception via a communication device.

In addition, wireless module 47 is fixed at a right edge of base 41, and is electrically connected to controller 43 via a control line. Wireless module 47 includes an antenna part, and is provided so that the antenna part is exposed from base 41 between base 41 and cover 3. The antenna part is a pattern antenna for transmitting and receiving radio signals, and is covered by housing. The antenna part is a conductive pattern mounted on the substrate. It is only necessary that the antenna part be an antenna for transmitting and receiving the radio signals, and the antenna part is not limited to the pattern antenna. For example, it is only necessary that the antenna part be an antenna capable of transmitting or receiving the radio signals, such as a chip antenna.

The radio signals include not only the identification information but also control signals for controlling operations performed by light-emitting module 60 via a remote controller etc. The operations include turn-on, turn-off, dimming (adjustment of brightness), color adjustment (adjustment of the color of light to be emitted (color temperature)) operations etc.

Storage 49 is electrically connected to control unit 43. Storage 49 is housed in case 7 together with controller 43. Storage 49 is a database storing predetermined time, and identification information by which lighting device 5 is identified. The identification information is information which is unique to lighting device 5 such as a type number etc., of lighting device 5, and is never updated. The predetermined time is preset time to be used by controller 43 to determine whether an elapsed time from time at which time count by a timer function was started to current time exceeds the predetermined time, based on the elapsed time and the predetermined time. The predetermined time may be, for example, time such as one minute and three minutes, and may be arbitrarily changed.

A semiconductor memory is employed as storage 49; the semiconductor memory is for example a flash memory, or an electrically erasable programmable read-only memory (EEPROM). It is to be noted that storage 49 may be provided inside controller 43.

Voltage detector 51 is configured with a circuit which detects that a voltage supplied from the grid power is being applied to power source 53. Voltage detector 51 is electrically connected to controller 43 and power source 53.

Power source 53 is electrically connected to light-emitting module 60. Light-emitting module 60 is a module which: has a long plate shape; includes a plurality of light sources 62 (examples of light-emitting elements), and circuit board 61 on which light sources 62 are mounted; and is capable of performing dimming control and color adjustment control. In this embodiment, eight light sources 62 are provided in a line on each of three circuit boards 61. Circuit boards 61 are arranged to form a straight line in the LEFTWARD-RIGHTWARD direction. Circuit board 61 arranged at the center has a right end electrically connected to the left end of right-hand side circuit board 61 and has a left end electrically connected to the right end of left-hand side circuit board 61.

Light sources 62 are mounted in a line on circuit boards 61. Each light source 62 is what is called an LED element of a surface mount device (SMD) type. The SMD-type LED element is specifically a package LED element in which an LED chip is mounted in a cavity formed using a resin, and a phosphor-containing resin is filled in the cavity. Light source 62 turns on and off under control by controller 43 mounted on lighting device 5. In addition, each light source 62 is subjected to dimming and color adjustment by means of controller 43 controlling power source 53.

Circuit boards 61 are each a mounting substrate for mounting light sources 62, and is for example, a ceramics substrate, a resin substrate, or an insulation-coated metal-base substrate. In addition, circuit board 61 has, for example, the shape of a plate having a rectangular plane when seen in plan view. It is to be noted that, on circuit board 61, a pair of electrode terminals (a positive electrode terminal and a negative electrode terminal) are formed to receive from power source 53 direct-current power for causing light sources 62 to emit light.

Power source 53 for supplying electric power for causing light sources 62 to emit light is electrically connected to controller 43. Power source 53 is disposed at the upper side of base 41 (at the side opposite to the side on which light-emitting module 60 is disposed. In other words, power source 53 is disposed in an area at the opposite side from circuit board 61 having base 41 inbetween. Power source 53 and light-emitting module 60 are apart from each other via base 41. Power source 53 may be housed in case 7.

Cover 3 is a cover for covering light-emitting module 60, and has a translucency for allowing light emitted from light-emitting module 60 to pass through. Cover 3 is formed, for example, with a translucent resin material such as acryl and polycarbonate, or a translucent material such as a clear glass material. In addition, in this embodiment, cover 3 has a function for diffusing light emitted by light-emitting module 60. For example, an opalescent light diffusion film is formed on cover 3 by causing a resin or a white pigment containing a light diffusion material (fine particles) such as silica or a calcium carbonate to adhere to the inner or outer surface of cover 3. In addition, cover 3 itself may be formed using a resin material etc. containing a light diffusion material dispersed therein.

It is to be noted that cover 3 which diffuses light may be configured not by dispersing a light diffusion material inside but by forming an opalescent light diffusion film containing a light diffusion material on the inner or outer surface of cover 3. Alternatively, cover 3 which diffuses light may be configured to have a light diffusion property by being subjected to a diffusion process, instead of using a light diffusion material. For example, cover 3 may be configured to have a light diffusion property by being subjected to a surface treatment such as embossing performed to form fine recesses and pressing protrusions in and on the inner or outer surface of a transparent panel, or by printing a dot pattern on the inner or outer surface of the transparent cover. It is to be noted that even when a diffusion treatment is performed, a light diffusion material may be additionally contained in order to enhance the light diffusion property.

It is not essential that cover 3 has a light diffusion function, and cover 3 may be clear at a certain level at which the inside of cover 3 is visible from outside.

As illustrated in FIG. 3, luminaire 1 configured like this turns on and off by means of a user performing an operation using terminal 101 such as a remote controller. The operation is, for example, that controller 43 turns on and off output of current to light-emitting module 60 via wireless module 47 and a control line.

In addition, luminaire 1 supports dimming and a color adjustment functions of light-emitting module 60. The dimming function is performed by means of controller 43 increasing and decreasing output of current to light-emitting module 60. In addition, the dimming function is performed by means of controller 43 changing the balance of current to be supplied to respective light sources 62 included in light-emitting modules 60. It is to be noted that current to be supplied to light-emitting module 60 is increased or decreased under, for example, pulse width modulation (PWM) control or the like performed by controller 43.

[Setting Method in Lighting System]

Next, how an installer installs luminaire 1 to body case 21 and the setting method in lighting system 100 in a pairing operation or the like are described with reference to FIGS. 5 to 8.

Figure 5:
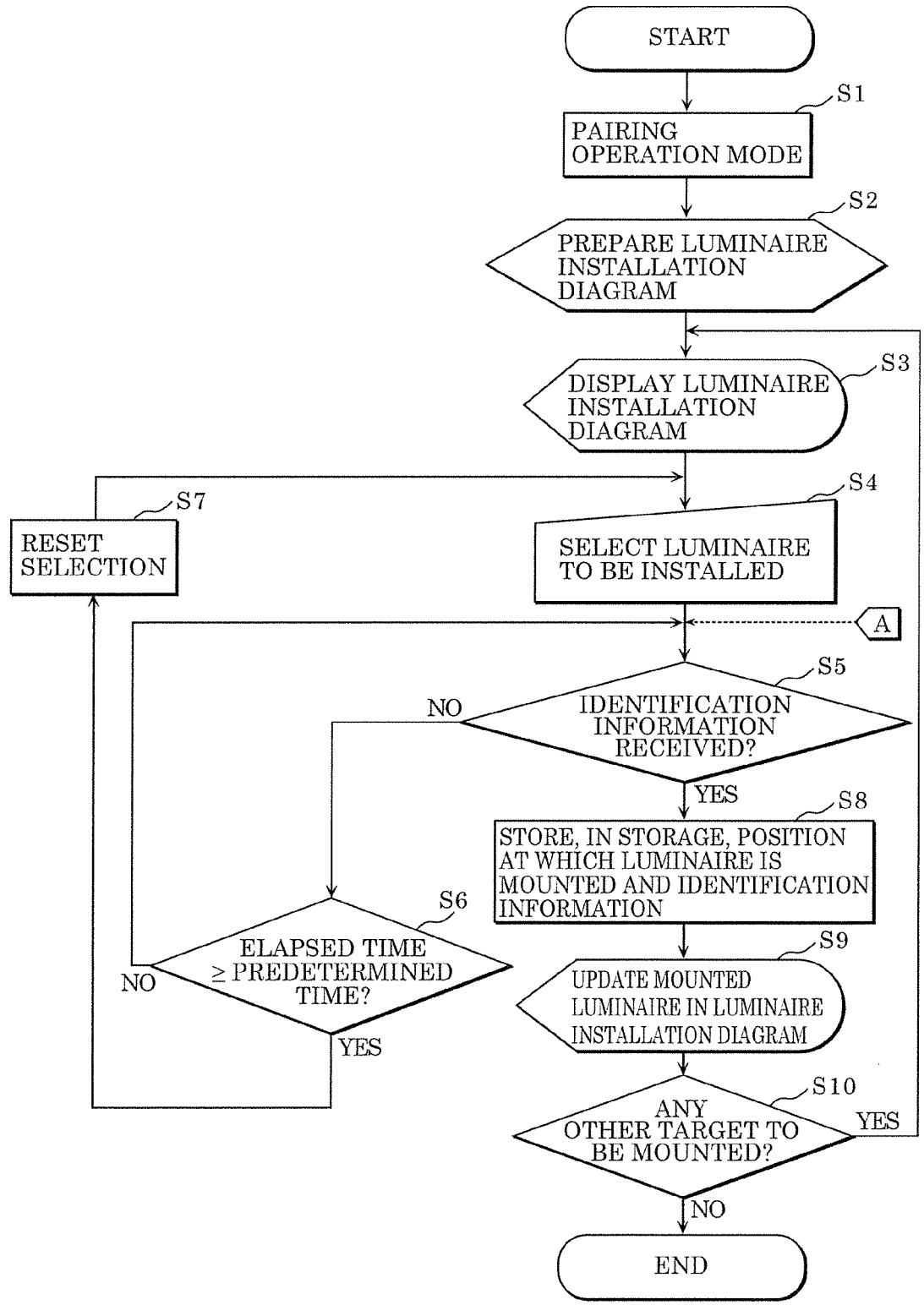
FIG. 5 is a flowchart of operations performed by a terminal, indicating a setting method in a lighting system according to the embodiment.
Figure 6:
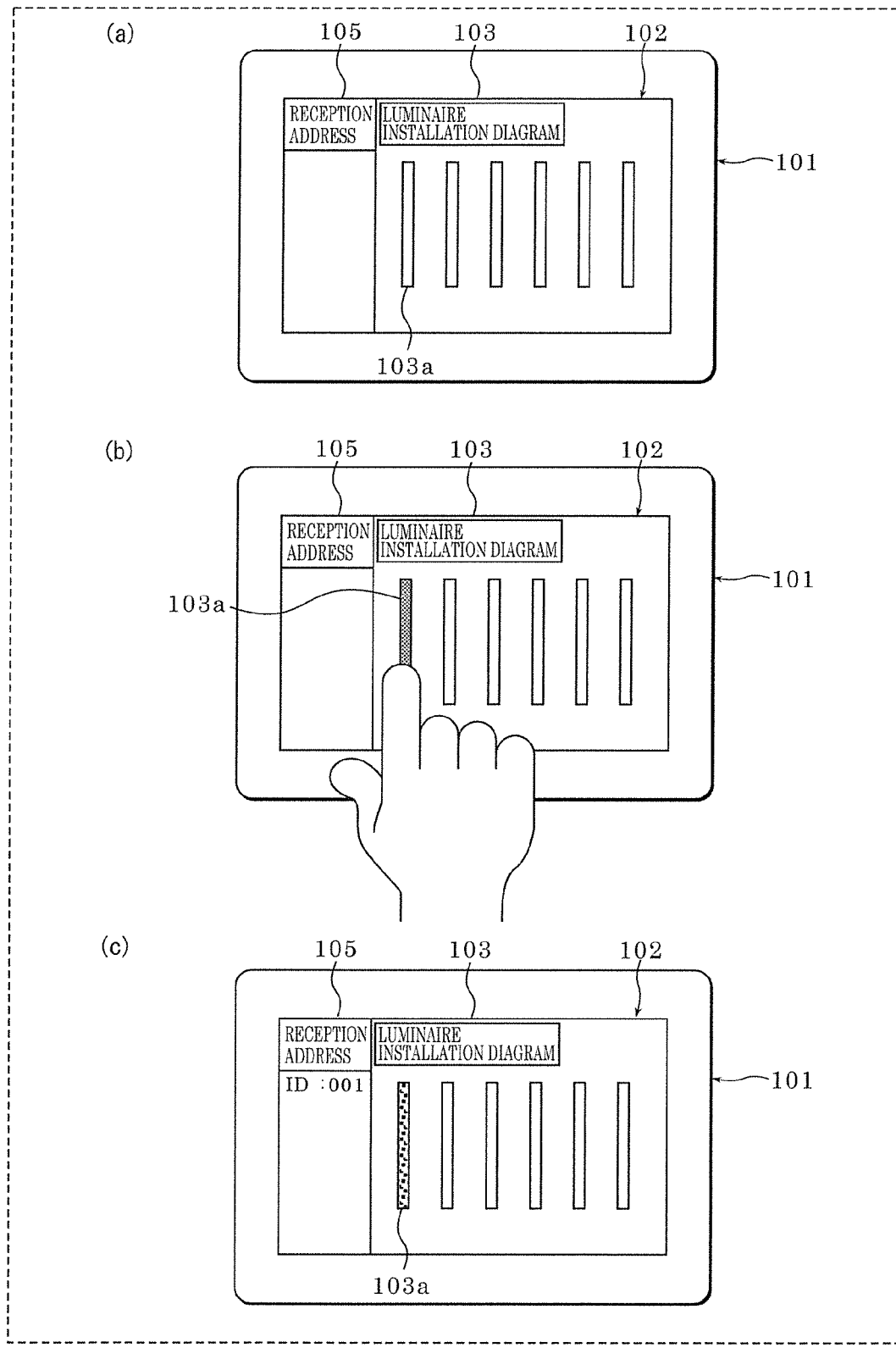
FIG. 6 is a schematic diagram of the terminal, indicating the setting method in the lighting system according to the embodiment.
Figure 7:
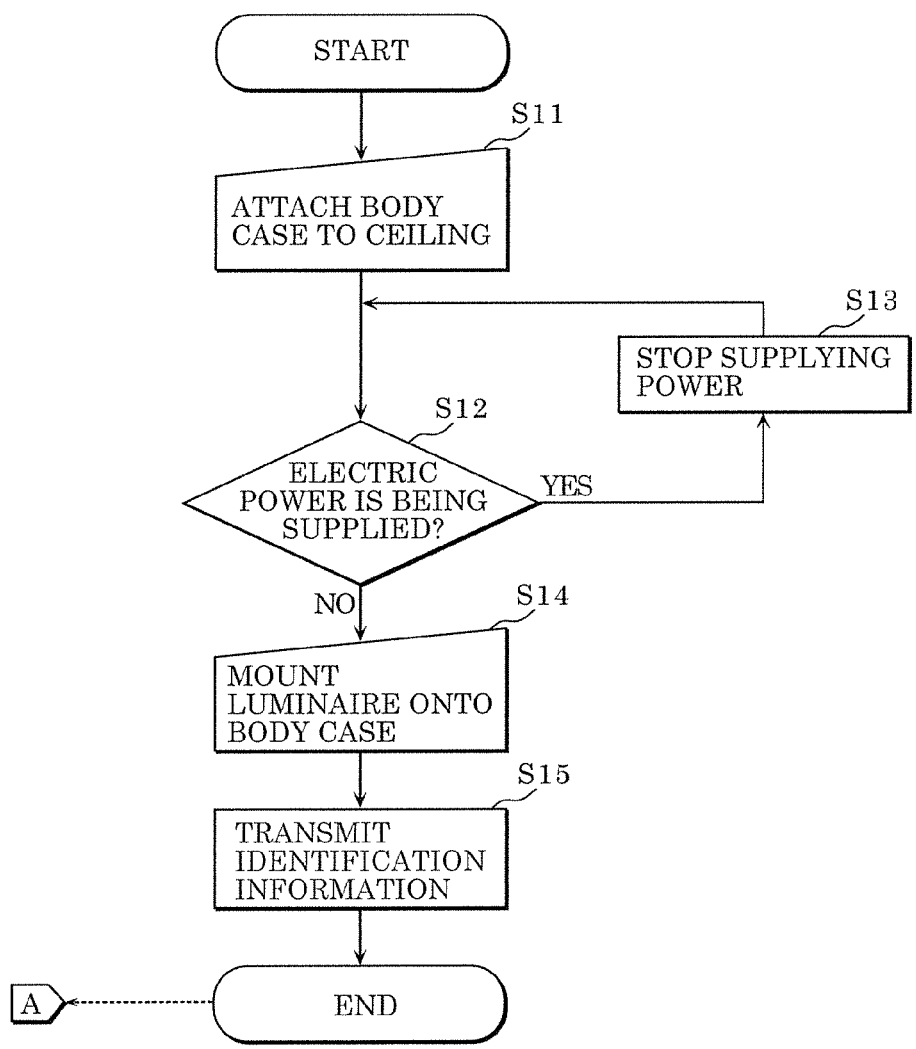
FIG. 7 is a flowchart indicating how to install a lighting device to a body case in the setting method in the lighting system according to the embodiment.
Figure 8:
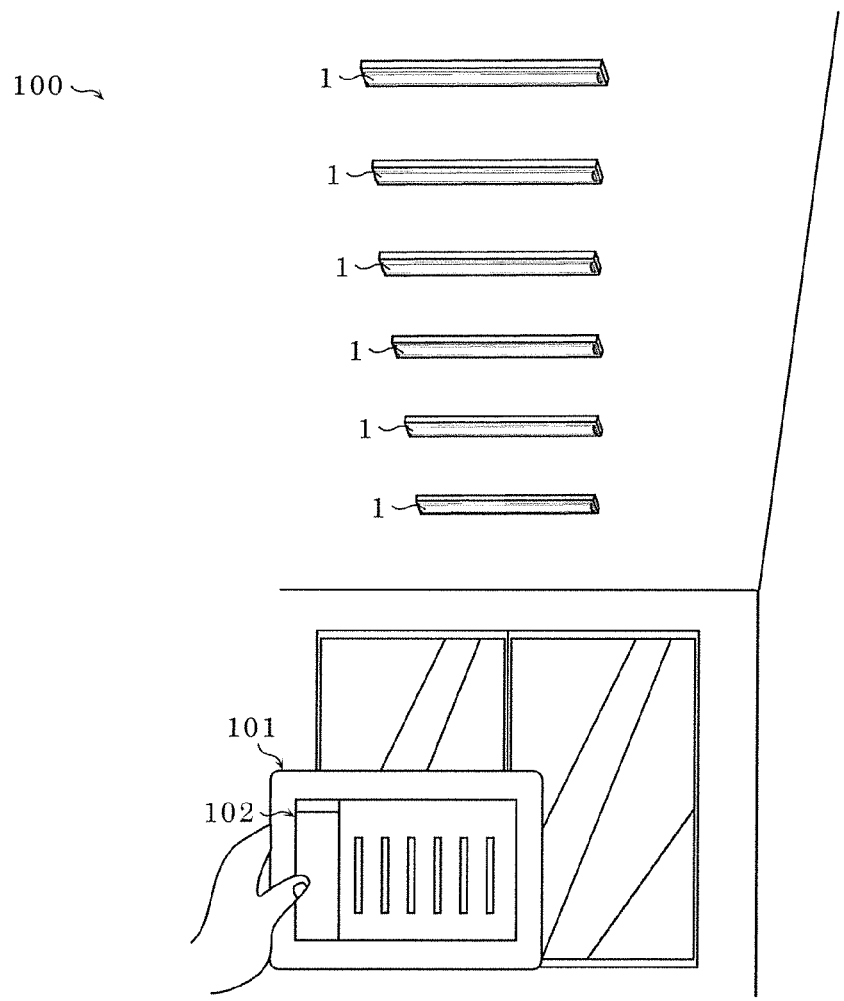
FIG. 8 is a schematic view of the lighting system according to the embodiment.

FIG. 5 is a flowchart of terminal 101 indicating the setting method in lighting system 100 according to this embodiment. In FIG. 6, each of (a), (b), and (c) is a schematic diagram of terminal 101 indicating the setting method in lighting system 100 according to this embodiment. FIG. 7 is a flowchart indicating processes for installing lighting device 5 to case 21, in the setting method in lighting system 100 according to this embodiment. FIG. 8 is a schematic view of lighting system 100 according to this embodiment.

A plurality of body cases 21 are installed in an installation area on the ceiling of a large facility which has been constructed. The installer mounts, one-to-one, lighting devices 5 onto body cases 21. In this embodiment, six body cases 21 are provided.

As illustrated in FIG. 5, the installer firstly activates terminal 101 that the installer is carrying to perform a pairing operation, and starts a pairing operation mode (Step S1). It is to be noted that terminal 101 has a program exclusive for pairing operations installed therein.

Next, the installer causes terminal 101 to obtain luminaire installation diagram 103 for installing luminaire 1. Luminaire installation diagram 103 is a preset diagram, and is obtained, for example, from a server via a network or the like. Luminaire installation diagram 103 is obtained as a preparation for installing luminaire 1 located correspondingly to luminaire installation diagram 103 (Step S2: an installation state obtaining step). It is to be noted that luminaire installation diagram 103 may be obtained from storage such as a USB memory.

Next, as illustrated in FIG. 5 and (a) of FIG. 6, terminal 101 displays, on display 102, luminaire installation diagram 103 for installing luminaire 1 and performing a pairing operation (Step S3). An image of RECEPTION ADDRESS is displayed at the left side of display 102, and luminaire installation diagram 103 is displayed at the remaining right side. In this embodiment, luminaire installation place 103a in which six luminaires 1 are installed is displayed in luminaire installation diagram 103.

Next, as illustrated in FIG. 5 and (b) of FIG. 6, the installer selects (taps) one luminaire installation place 103a from among a plurality of luminaire installation places 103a in luminaire installation diagram 103 displayed on display 102. In response that the installer selected the one luminaire installation place 103a on display 102, the color of the one luminaire installation place 103a on display 102 changes to show the selection. It is to be noted that the one luminaire installation place 103a may be caused to blink as long as the selection can be shown.

Next, as illustrated in FIG. 5, terminal 101 determines whether identification information transmitted from lighting device 5 has been received or not (Step S5). When the identification information which is transmitted from lighting device 5 has not yet been received (NO in Step S5), whether an elapsed time from when Step S5 was started to current time reaches or exceeds the predetermined time or not (Step S6). The time at which Step S5 was started is time at which the installer selected the one luminaire installation place 103a on display 102.

When the elapsed time reaches or exceeds the predetermined time (YES in Step S6), it is determined that lighting device 5 has not installed for the predetermined time, and the selection made in Step S4 is reset (Step S7). Then, a return to Step S4 is made.

When the elapsed time is within the predetermined time (NO in Step S6), a return to Step S5 is made. In other words, terminal 101 transitions to a reception waiting state for waiting, until the predetermined time, for receiving identification information which is transmitted from lighting device 5 (Step S5: an example of a reception waiting step). Then, when the reception waiting state is created in Step S5, a transition is made to the flow of FIG. 7 in which the installer attaches lighting device 5 to body case 21. It is to be noted that, for example, in a state where the selection made in Step S4 is reset as in Step S7, terminal 101 receives the transmitted signal of the identification information but performs a process for invalidating the signal.

As illustrated in FIG. 7, the installer mounts body case 21 in the installation area of the ceiling, with reference to luminaire installation place 103a selected in luminaire installation diagram 103 (Step S11).

Next, the installer determines whether electric power is being supplied from the grid power to body case 21 attached to the installation area of the ceiling (Step S12). In short, the installer performs an operation for checking whether electric power is flowing from the grid power or not. It is to be noted that the determination as to whether electric power is flowing from the grid power or not may be automatically determined by terminal 101 or the like.

When electric power from the grid power is being supplied to body case 21 (YES in Step S12), the installer stops the supply of grid power (Step S13). Then, a return to Step S12 is made.

When no electric power is being supplied from any grid power to body case 21 (NO in Step S12), Next, the installer mounts lighting device 5 onto body case 21 (Step S14: a mounting step).

When lighting device 5 is mounted onto body case 21, pressing protrusion 21b presses piezo-electric element 45a of power generator 45 to supply the electric power generated by piezo-electric element 45a to controller 43. Immediately after Step S14 (the moment when or immediately after lighting device 5 is mounted onto body case 21), controller 43 automatically transmits the identification information to terminal 101 via wireless module 47, using the electric power (Step S15: an example of a transmitting and receiving step). Then, as illustrated in FIG. 5, a return to Step S5 in the flow at the terminal 101 side is made (a transition is made from arrow A in FIG. 7 to arrow A in FIG. 5). In this way, when lighting device 5 is mounted within the predetermined time, the reception waiting state in Step S5 is reset.

Next, terminal 101 receives the identification information transmitted in Step S14 of FIG. 7 (YES in Step S5: an example of a transmitting and receiving step), and associates (performs pairing of) location information indicating luminaire installation place 103a selected in luminaire installation diagram 103 and the transmitted identification information of lighting device 5. Terminal 101 stores the location information and the identification information in the storage of terminal 101 (Step S8: an example of a pairing step).

Next, terminal 101 displays "ID:001" for the image "RECEPTION ADDRESS" displayed to the left of display 102 (displays the installation state), and updates luminaire installation place 103a selected in luminaire installation diagram 103 on display 102 (changes the color of luminaire installation place 103a selected in luminaire installation diagram 103 to show that lighting device 5 has been installed) (Step S9: an example of a pairing step). In this way, the installer can recognize the state where lighting device 5 has been installed by referring to luminaire installation diagram 103.

Next, terminal 101 determines whether there remains any place at which lighting device 5 should be mounted or not (Step S10). In this embodiment, five places at which lighting devices 5 should be mounted remain (YES in Step S10), and thus a return to Step S3 is made. This operation is repeated five other times. In Step S10, no place at which lighting devices 5 should be mounted remains in Step S10 (NO in Step S10), and thus the flow ends.

In this way, the luminaire 1 mounting operations including the operations for pairing luminaires 1 and terminal 101 are performed. Through these operations, lighting system 100 is configured to include the plurality of luminaires 1 and terminal 101 as illustrated in FIG. 8.

[Operations Performed in Lighting System]

Next, operations performed by lighting system 100 after the operation for pairing luminaires 1 and terminal 101 are described with reference to FIGS. 8 and 9.

Figure 9:
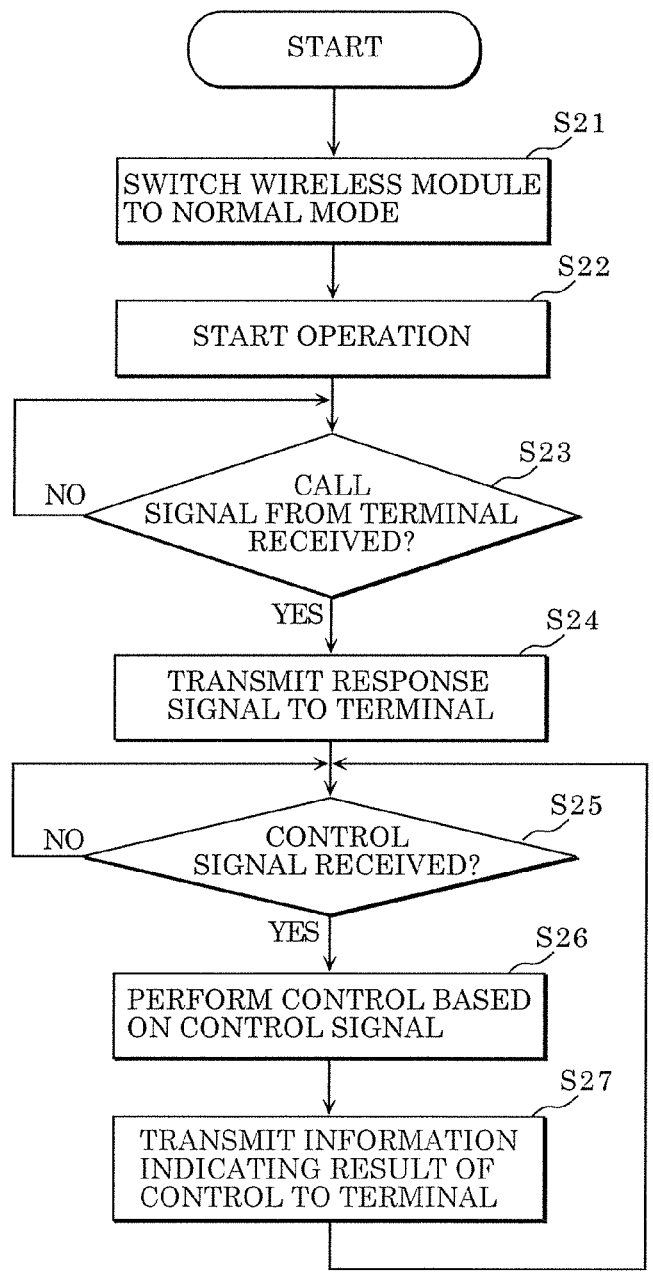
FIG. 9 is a flowchart indicating initial settings of luminaire 1 and operations performed subsequently in the lighting system according to the embodiment.

FIG. 9 is a flowchart indicating initial settings of luminaire 1 and operations performed subsequently in lighting system 100 according to this embodiment.

First, a user starts charging luminaires 1. As illustrated in FIG. 8, the user performs initial settings for six luminaires 1 using terminal 101. Here, the user may be the installer or not.

In the flow for mounting lighting devices 5, controller 43 causes wireless module 47 to switch from a mode (an energy harvest mode) for transmitting the identification information using electric power generated by piezoelectric element 45a. After the pairing operations are completed, the energy harvest mode is transitioned to a normal use mode in which wireless module 47 can receive control signals for controlling turn-on, turn-off, dimming (adjustment of brightness), color adjustment (adjustment of the color of light to be emitted (color temperature)) etc. (Step S21).

Lighting device 5 starts a normal operation such as an operation for changing a color temperature of light from light source 62 in light-emitting module 60 to 5000 K (Step S22).

Next, when terminal 101 transmits a call signal to luminaire 1, controller 43 of luminaire 1 receives the call signal while determining whether the call signal has been received via wireless module 47 (Step S23).

Next, controller 43 transmits a response signal to terminal 101 via wireless module 47 (Step S24). Terminal 101 receives the response signal. With this, initial settings from Step S21 to Step S24 end.

Through these initial settings, the user can perform normal operations on luminaire 1. Luminaire 1 determines whether a turn-on, turn-off, dimming (adjustment of brightness), or color adjustment (adjustment of the color of light to be emitted (color temperature)) operation or the like is being performed by the user via terminal 101. In short, controller 43 determines whether a control signal based on the operation has been received or not (Step S25). When no control signal has been received (NO in Step S25), a return is made to Step S25, and a determination is made in the same manner until a control signal is received from terminal 101.

When the user performs an operation on terminal 101, a control signal is transmitted to luminaire 1 via terminal 101, and controller 43 receives the control signal via wireless module 47 (YES in Step S25).

Controller 43 performs control based on the received control signal (Step S26). It is to be noted that when a turn-off operation is performed in Step S26, the flow may end with Step S26.

Next, controller 43 of luminaire 1 transmits information indicating the result of the control to terminal 101 via wireless module 47, and terminal 101 receives the information and causes display 102 to display the information (Step S27). A return to Step S25 is made, and reception of a control signal is waited for until a next operation is performed by the user. It is to be noted that the user can check by eyesight the result of the control, and thus Step S27 is not an essential element.

[Effects]

Next, a description is given of effects provided by luminaire 1, lighting system 100, and the setting method in lighting system 100 according to this embodiment.

As described above, luminaire 1 according to this embodiment includes body case 21 and lighting device 5 mounted on body case 21. Lighting device 5 includes: power generator 45 which generates electric power upon being pressed when lighting device 5 including body case 21 and light source 62 is mounted onto body case 21; wireless module 47 which performs wireless communication; and controller 43 which transmits, using the electric power generated by power generator 45, identification information by which lighting device 5 is identified, via wireless module 47 when lighting device 5 is mounted onto body case 21.

With this configuration, since controller 43 transmits the identification information using the electric power generated by power generator 45 only by mounting lighting device 5 onto body case 21, it is possible to easily associate terminal 101 and lighting device 5.

Thus, it is possible to perform a pairing operation even when no electric power is being supplied from any grid power. In addition, when the pairing operation is performed only by mounting lighting device 5 onto body case 21, it is also possible to increase an operation efficiency (reduce the troublesomeness for the pairing operation) in the installation operation of luminaire 1.

In addition, in luminaire 1 according to this embodiment, piezo-electric element 45a, controller 43, and wireless module 47 are fixed to lighting device 5.

This configuration makes it easy to electrically connect lighting device 5 and body case 21.

In addition, in luminaire 1 according to this embodiment, power generator 45 is piezo-electric element 45a, and body case 21 has pressing protrusion 21b for pressing piezo-electric element 45a. When lighting device 5 is mounted onto body case 21, piezo-electric element 45a is pressed by pressing protrusion 21b, so that controller 43 is supplied with electric power for transmitting the identification information.

With this configuration, since lighting device 5 presses piezo-electric element 45a of power generator 45 so that the electric power generated by power generator 45 when lighting device 5 is mounted onto body case 21 is supplied to controller 43, it is possible to transmit the identification information to terminal 101 even when no electric power is being supplied from any gird power to luminaire 1. Thus, it is possible to perform a pairing operation without supply of electric power from the grid power.

The configuration is useful especially when a pairing operation is performed in a comparatively large facility such as an office and a warehouse.

As described above, lighting system 100 according to this embodiment includes luminaire 1 and terminal 101 including display 102. When lighting device 5 is mounted onto body case 21, terminal 101 receives, from the luminaire, the identification information of mounted lighting device 5, updates information indicating the installation state of luminaire 1, and displays the updated information indicating the installation state on display 102.

With this configuration, the installer can perform the operation while checking the installation state, and thus the installer can perform the pairing operation easily.

In particular, when information indicating that luminaire 1 was mounted has not yet been displayed although lighting device 5 was mounted onto body case 21, the installer can determine that the installation location of luminaire 1 is wrong, and thus, the installer can correct the wrong installation location. In other words, it is possible to control the installation efficiency so as not to be reduced due to repetition of an installation operation of luminaire 1.

In addition, the plurality of luminaires 1 are mounted in the installation area for mounting the plurality of luminaires 1 in the lighting system according to this embodiment.

With this configuration, the installer can perform the pairing operation while checking the installation state, and thus the installer can perform the pairing operation easily. In other words, even when the plurality of luminaires 1 are to be mounted, it is possible to mount luminaires 1 at right locations, and thus the installer can perform the pairing operations easily.

As described above, the setting method in lighting system 100 according to this embodiment includes: an installation state obtaining step (S2) for obtaining, by terminal 101, the installation state of luminaire 1 in the installation area; a reception waiting step (S5) for selecting one luminaire 1 from among the plurality of luminaires 1 displayed on display 102, and transitioning to a state for waiting the identification information; a mounting step (S14) for mounting lighting device 5 in luminaire 1 selected in the reception waiting step (S5) onto body case 21; transmitting and receiving steps (S5, S15) for receiving, by terminal 101, the identification information transmitted from controller 43 via wireless module 47, immediately after the mounting step (S14); and pairing steps (S8, S9) for associating terminal 101 and luminaire 1.

According to this method, it is possible to perform a pairing operation between mounted luminaire 1 and terminal 101 only by mounting lighting device 5 onto body case 21 after the one luminaire 1 is selected in the reception waiting step (S5). For this reason, it is possible to execute such an operation immediately even when no electric power is being supplied from any grid power in the facility in which an installation operation of luminaire 1 is performed.

Accordingly, the setting method in lighting system 100 like this makes it possible to enhance an operability of the installation operation of luminaire 1.

(Other Variations)

Although the luminaire and the lighting system according to the present disclosure have been described above based on the embodiment, the present disclosure is not limited to the embodiment.

Figure 10:
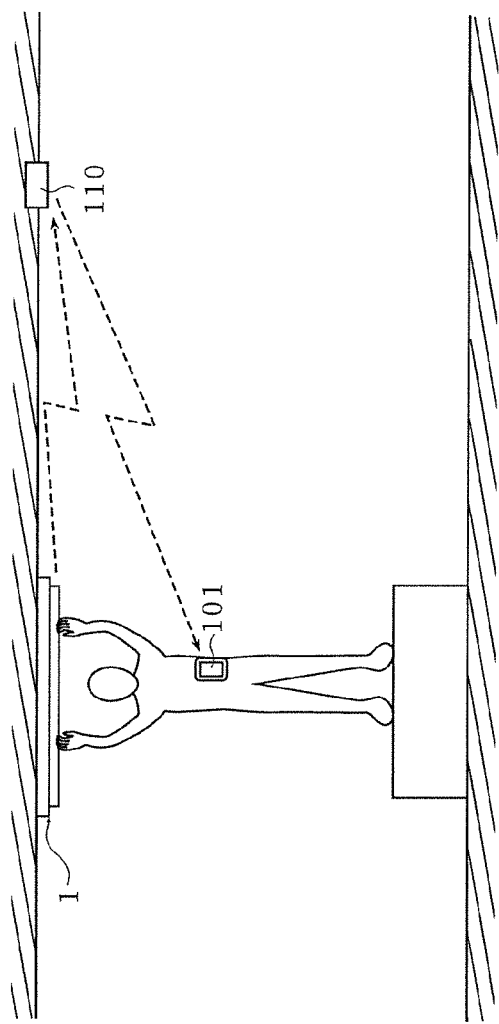
FIG. 10 is a schematic diagram indicating a state in which an installer is mounting the lighting device to the body case in the lighting system according to a variation of the embodiment.

The setting method in lighting system 100 according to a variation of the embodiment in the present disclosure is described with reference to FIG. 10. FIG. 10 is a schematic diagram indicating a state in which an installer is mounting a lighting device onto a body case in lighting system 100 according to the variation of the embodiment. Although the embodiment relates to a case where the same protocol is used by luminaire 1 and terminal 101, the variation of the embodiment relates to a case where different protocols are used in the setting method of lighting system 100. As illustrated in FIG. 10, luminaire 1 and terminal 101 communicate with each other via relay 110. Relay 110 is a gateway which converts an electric wave format, a protocol, a frequency, etc. Relay 110 may supply electric power from a grid power, or may supply electric power of primary battery or secondary battery. When the installer mounted the lighting device to the body case, identification information is transmitted to relay 110 as shown by an arrow in FIG. 10. Relay 110 converts the protocol of the identification information into a protocol which can be recognized by terminal 101, and transmits the identification information after the conversion to terminal 101. In this way, luminaire 1 and terminal 101 can perform a pairing operation.

In addition, in a luminaire according to the embodiment, a lighting device may include a current-carrying connector disposed at a lighting device side for supplying electric power for causing light sources to emit light. A body case may include a current-carrying connector disposed at a case side which is electrically connected to the current-carrying connector disposed at the lighting device side when the lighting device is mounted onto the body case. The luminaire may be configured so that the current-carrying connector disposed at the case side and the current-carrying connector disposed at the lighting device side are electrically connected to each other by only mounting the lighting device onto the body case. In this case, the current-carrying connector disposed at the case side and the current-carrying connector disposed at the lighting device side can be easily connected.

It is to be noted that, in the embodiment, it is also good that the operation order for mounting the lighting device onto the body case may be set in advance, and the mounting operation (batch processing) is performed according to the operation order.

It is to be noted that, in the embodiment, it is also good that pairing information obtained by pairing between the luminaires and a plurality of terminal devices may be combined in the terminals. For example, one of two installers performs pairing operations for a half of the luminaire installation diagram in (a) of FIG. 6, and the other installer performs pairing operations for the remaining half. When both of the installers finished the pairing operations between the luminaires and the terminals, pairing information items each indicating that three pairing operations have been completed are displayed in the luminaire installation diagrams in the respective terminals of the installers. By sharing the pairing information items of the respective installers and combining the pairing information items, it is possible to obtain one pairing information item indicating that all pairing operations have been finished. It is also good to combine pairing information items together with batch processing.

It is to be noted that, in the embodiment, it is also good that a pressing protrusion is provided on a base so that identification information of the luminaire is transmitted to the terminal when the luminaire is mounted onto the body case, and a power generator and a wireless module may be provided in the body case.

In addition, in the present disclosure, a luminaire may be a luminaire capable of communicating with a program distribution server via the Internet. The luminaire may include hardware corresponding to a plurality of functions and a storage capable of rewriting software items (programs) for causing the hardware to operate according to the respective functions. In order for the luminaire to emit light according to one of the functions, a software item (a program) for causing the hardware to operate correspondingly to the function is stored in the storage. This software item may be stored in the storage in advance. Alternatively, a program distributed from the program distribution server may be received and stored in the storage. When the program distributed from the program distribution server is received, a user of the luminaire selects a desired function (program) using an input device such as a smartphone, a tablet, or the like. In response to this, the selected program is distributed from the program distribution server to the luminaire, and the distributed program is stored in the storage inside the luminaire. In this way, the user can use the function of luminaire corresponding to the distributed program.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system, comprising:
a luminaire; and
a terminal which includes a display, wherein:
the luminaire comprises:
a body case; and
a lighting device mounted on the body case and including:
a power generator which generates electric power upon being pressed by the body case when the lighting device including a light-emitting element is mounted onto the body case;
a wireless communicator which performs is wireless communication; and
a controller which transmits identification information by which the lighting device is identified, via the wireless communicator using the electric power generated by the power generator when the lighting device is mounted onto the body case, and
when the lighting device is mounted onto the body case, the terminal receives, from the luminaire, the identification information of the lighting device mounted onto the body case, updates information indicating an installation state of the luminaire, and displays the updated information indicating the installation state on the display.

2. The lighting system according to claim 1,
wherein an installation area for installing the luminaire accommodates a plurality of the luminaires.

3. A setting method in the lighting system according to claim 2, comprising:
obtaining, by the terminal, information indicating installation states of the plurality of luminaires in the installation area;
selecting one luminaire from among the plurality of luminaires displayed on the display after the obtaining, and placing the identification information in a reception waiting state;
mounting, onto the body case, the lighting device in the one luminaire selected in the selecting;
receiving, by the terminal, the identification information transmitted by the controller via the wireless communicator, immediately after the mounting; and
pairing the terminal with the one luminaire.

4. A luminaire, comprising:
a body case; and
a lighting device mounted on the body case and including:
a piezo-electric element which generates electric power upon being pressed when the lighting device including a light-emitting element is mounted onto the body case;
a wireless communicator which performs wireless communication; and
a controller which transmits identification information by which the lighting device is identified, via the wireless communicator using the electric power generated by the piezo-electric element when the lighting device is mounted onto the body case.

5. The luminaire according to claim 4, wherein:
the body case has a protrusion, and
the piezo-electric element is pressed by the protrusion when the lighting device is mounted onto the body case, so that the controller is supplied with the electric power for transmitting the identification information.

6. The luminaire according to claim 5,
wherein the piezo-electric element, the controller, and the wireless communicator are fixed to the lighting device.

7. The luminaire according to claim 4,
wherein the lighting device includes a current-carrying connector disposed at a lighting device side which supplies electric power for causing the light-emitting element to emit light, and
the body case includes a current-carrying connector disposed at a case side which is electrically connected to the current-carrying connector disposed at the lighting device side when the lighting device is mounted onto the body case.

8. A lighting system, comprising:
the luminaire according to claim 4; and
a terminal which includes a display,
wherein, when the lighting device is mounted onto the body case, the terminal receives, from the luminaire, the identification information of the lighting device mounted onto the body case, updates information indicating an installation state of the luminaire, and displays the updated information indicating the installation state on the display.

9. The lighting system according to claim 8,
wherein an installation area for installing the luminaire accommodates a plurality of the luminaires.

10. A setting method in the lighting system according to claim 9, comprising:
obtaining, by the terminal, information indicating installation states of the plurality of luminaires in the installation area;
selecting one luminaire from among the plurality of luminaires displayed on the display after the obtaining, and placing the identification information in a reception waiting state;
mounting, onto the body case, the lighting device in the one luminaire selected in the selecting;
receiving, by the terminal, the identification information transmitted by the controller via the wireless communicator, immediately after the mounting; and
pairing the terminal with the one luminaire.

11. A luminaire, comprising:
a body case; and
a lighting device mounted on the body case and including:
a piezo-electric element which generates electric power upon being pressed when the lighting device including a light-emitting element is mounted onto the body case;
a wireless communicator which performs wireless communication; and
a controller which transmits identification information by which the lighting device is identified, via the wireless communicator using the electric power generated by the piezo-electric element when the lighting device is mounted onto the body case, wherein:
the lighting device includes a current-carrying connector disposed at a lighting device side which supplies electric power for causing the light-emitting element to emit light, and
the body case includes a current-carrying connector disposed at a case side which is electrically connected to the current-carrying connector disposed at the lighting device side when the lighting device is mounted onto the body case.

12. The luminaire according to claim 11, wherein:
the body case has a protrusion, and
the piezo-electric element is pressed by the protrusion when the lighting device is mounted onto the body case, so that the controller is supplied with the electric power for transmitting the identification information.

13. The luminaire according to claim 12,
wherein the piezo-electric element, the controller, and the wireless communicator are fixed to the lighting device.

14. A lighting system, comprising:
the luminaire according to claim 11; and
a terminal which includes a display,
wherein, when the lighting device is mounted onto the body case, the terminal receives, from the luminaire, the identification information of the lighting device mounted onto the body case, updates information indicating an installation state of the luminaire, and displays the updated information indicating the installation state on the display.

15. The lighting system according to claim 14,
wherein an installation area for installing the luminaire accommodates a plurality of the luminaires.

16. A setting method in the lighting system according to claim 15, comprising:
obtaining, by the terminal, information indicating installation states of the plurality of luminaires in the installation area;
selecting one luminaire from among the plurality of luminaires displayed on the display after the obtaining, and placing the identification information in a reception waiting state;
mounting, onto the body case, the lighting device in the one luminaire selected in the selecting;
receiving, by the terminal, the identification information transmitted by the controller via the wireless communicator, immediately after the mounting; and
pairing the terminal with the one luminaire.

* * * * *